United States Patent
Segiel Jr.

(10) Patent No.: US 6,648,742 B1
(45) Date of Patent: Nov. 18, 2003

(54) DUST DIRECTOR PORTABLE VACUUM GUARD

(76) Inventor: Theodore R. Segiel Jr., 2004 Wilcox Cir., Murrysville, PA (US) 15668

( * ) Notice: Subject to any disclaimer, the term of this patent is extended or adjusted under 35 U.S.C. 154(b) by 0 days.

(21) Appl. No.: 10/161,299

(22) Filed: Jun. 4, 2002

(51) Int. Cl.[7] .............................................. B24B 55/10
(52) U.S. Cl. ...................... 451/451; 451/456; 451/453; 451/358; 30/124; 83/100
(58) Field of Search ................................ 451/451, 453, 451/454, 455, 456, 344, 358, 359; 30/124, 390; 83/100, 544

(56) References Cited

U.S. PATENT DOCUMENTS

| | | | | |
|---|---|---|---|---|
| 1,888,679 A | * | 11/1932 | Knapp ........................ 83/440.2 |
| 3,468,076 A | * | 9/1969 | Jones ........................... 451/456 |
| 3,585,980 A | * | 6/1971 | Mellor ...................... 125/13.01 |
| 4,063,478 A | * | 12/1977 | Stuy ............................... 83/100 |
| 4,192,104 A | * | 3/1980 | Patenaude ................... 451/456 |
| 5,084,972 A | * | 2/1992 | Waugh ......................... 30/124 |
| 5,125,190 A | * | 6/1992 | Buser et al. ................. 451/456 |
| 5,411,433 A | * | 5/1995 | Keller .......................... 451/451 |
| 5,566,457 A | * | 10/1996 | Batschari et al. ............. 30/390 |
| 5,931,072 A | * | 8/1999 | Shibata ........................... 83/98 |
| 6,108,912 A | * | 8/2000 | Radigan ....................... 30/124 |
| 6,299,393 B1 | * | 10/2001 | Anders ........................ 409/131 |

* cited by examiner

Primary Examiner—Joseph J. Hail, III
Assistant Examiner—Hadi Shakeri
(74) Attorney, Agent, or Firm—M. Reid Russell

(57) ABSTRACT

A dust director portable vacuum guard for mounting onto a bore of a portable angle grinder. The dust director includes a housing with parallel inner and outer walls and an end web adjacent to a straight barrel that is secured along aligned edges of the walls. The barrel is slotted from a forward dust collected end to the web and is stepped at a selected distance apart from the inner wall upper edge, functioning as a baffle. An attachment ring is pivotally mounted in the housing inner wall to releasably couple to an angle grinder bore and pivot around that bore upon release of a spring loaded thumb screw. An extension cover is included on an end of the housing to allow for sawing through a corner.

14 Claims, 6 Drawing Sheets

DUST DIRECTOR PORTABLE VACUUM GUARD

BACKGROUND OF THE INVENTION

1. Field of the Invention

This invention relates to dust containment guards for electrical and air tools, and in particular to a dust guard for mounting to an angle grinder, circular saw, or the like, that includes a vacuum port for connection to a vacuum hose to pull dust and materials as are generated by tool operation off of a work surface and collect them in a vacuum system

2. Prior Art

Electrical and air tools that incorporate turning blades or wheels for cutting or removing material off from a surface are, of course, well known, as are guards or shrouds for fitting onto a tool to separate an operators hands from a moving tool edge or surface. A common example of such arrangement is found in a skill saw where, when an operator, holding the saw by its handle, pushes the turning tool blade into a section of wood, and lifts a spring loaded shroud by contact with the section of wood edge. The shroud is thereby lifted onto, and travels along, the wood surface where the turning saw blade is cutting. Such guard arrangement is, of course, well known for use with skill saws, and where a skill saw, or a like saw has been used in a shop setting, such has often included a vacuum port for attachment onto a vacuum hose end for drawing dust, as is produced by the blade sawing action, off from the work surface, and with that dust then traveling into a vacuum system.

Angle grinders are, of course, tools that includes a turning blade, and are hand held by an operator. In practice, the operator holds an angle grinder handle and urges the turning blade edge against or into an item or surface, such as a block wall, to cut or saw into and across that item or surface. Such angle grinder mounts the blade to a drive shaft that is journaled through a bore whereto a guard or guards are fitted. In which arrangement, the drive shaft and bore are arranged at a right angle to the handle. In use, the turning blade generates a large amount of dust, for example, as when it is used to cut or saw into a wall, or the like. Where the angle grinder is used to cut or saw along a line drawn onto a wall surface, or the like, it is important that an operator be able to see the turning blade sawing edge so as to direct that sawing edge along the scribed line. Accordingly, it is desirable to provide an arrangement for removing dust as is generated in wall cutting operations that will not hinder an operators visibility of the turning blade sawing edge that is in contact with the that wall surface. Whereas, which arrangement still needs to provide proper positioning of the guard vacuum end so as to efficiently remove the sawed materials.

The invention is in a dust director meets the operators need to have a clear view of the turning blade edge while affording the operator with a view of the work surface. To meet these needs, the invention provides a dust director portable vacuum guard that connects a barrel portion to a vacuum hose where an opposite barrel end can be positioned for efficiently drawing dust and particles off from the wall, or other surface being cut or sawed. Further, the unique features of the invention include: an arrangement for mounting the dust director to an angle grinder by a use of an attachment ring that provides for fastening the dust director guard securely to the angle grinder's bore while allowing the dust director to be maintained in a swiveling or fixed cutting position, with the attachment ring, sized to be suitable for mounting onto a number of angle grinders, or like tools, as are currently being marketed; an extension cover that is pivotally attached to an open side of the dust director portable vacuum guard housing to be swung open to expose a side edge of the angle grinder blade to enable the cutting or sawing of an inside corner of a masonry wall: and an air baffle that is part of a barrel of the dust director guard that significantly increases the vacuum efficiency in a removal of grinder dust removal from the work surface.

BRIEF SUMMARY OF THE INVENTION

It is a principal object of the present invention to provide a light weight dust director portable vacuum guard for mounting onto a conventional angle grinder, or like tool, that will shield the turning tool blade while allowing the operator to see the work area and tool edge and is connected through a hose to a vacuum to draw materials as are produced by the turning tool blade off from the work surface.

Another object of the present invention is to provide a dust director portable vacuum guard that, when mounted onto a conventional angle grinder, or like tool, provides the operator with the ability to adjust the guard to their personal cutting styles, that is comfortably held by the operator and provides for an efficient dust removal off of a work surface.

Another object of the present invention is to provide a dust director portable vacuum guard arranged for mounting onto a number of commercially available angle grinders, or the like, so as to be capable of swiveling and, alternatively, can be fixed in position relative to a bore wherethrough a turning tool blade drive is journaled, allowing for guard pivoting between a first position where the angle grinder blade can be use to saw along a wall, and where the guard is freed to rotate allowing the blade to turn into and through a corner.

Another object of the present invention is to provide a dust director portable vacuum guard having an open tube as a vacuum barrel with a large attachment end for receiving a vacuum hose fitted thereover, facilitating high volume of suction, and includes a baffle for improving vacuum efficiency.

Still another object of the present invention is to provide a dust director portable vacuum guard that is configured to expose the turning blade edge and sides, giving an operator both good blade visibility and facilitating their guiding the turning blade along a line scribed over a surface and provides even for cutting or sawing into and out of a walls inside corner.

Still another object of the present invention is to provide a dust director portable vacuum guard with an extension cover arranged to cover the entire turning blade that is configured to allow a lifting of the extension cover when the blade is not turning, for cutting inside of a corner, with the extension cover then easily restored to its blade covering attitude after the corner cut is made.

Still another object of the present invention is to provide a dust director portable vacuum guard that allows pivoting of the angle grinder relative to the guard housing to allow the angle grinder blade to cut or saw into a wall inside corner, providing an operator with a blade shield that is easy to use and that provides cutting or sawing versatility.

Still another object of the present invention is to provide a dust director portable vacuum guard that is easy and quick to install onto a conventional portable angle grinder.

The present invention is in a dust director portable vacuum guard that includes a housing with an attachment ring for fitting onto a portable angle grinder, arranged for mounting onto a tool bore, preferably a portable angle grinder. To provide this mountings, the angle grinder cutting blade is first de-mounted from the angle grinder bore, as by turning a mounting bolt that fits through the blade center coupling opening into a drive and is journaled in the grinder bore. The dust director portable vacuum guard includes a grinder bore receiving, hole formed through an inner side wall wherein the attachment ring is pivotally mounted and is held in place by a spring loaded thumb screw. The dust director portable vacuum guard inner side wall is one of a pair of parallel inner and outer side walls that extend at right angles from junctions with a guard vacuum barrel and connect, along rear edges, to a back wall. The vacuum barrel is a straight tube that is arranged for connection, on an exhaust end, to a vacuum hose, and incorporated an air baffle as a component that provides for improved dust collection performance.

The dust director portable vacuum guard includes the attachment ring for mounting an angle grinder bore thereto and is releasable to allow rotation and is formed to couple to the bores of a number of commercially available angle grinders utilizing four equal spaced threaded screw holes. To mount the attachment ring to the angle grinder bore, for positioning the dust director guard at a desired angle to the angle grinder turning blade, two of the tour holes are selected to receive set screws turned therein. Re-positioning of the dust director portable vacuum guard on the angle grinder bore requires only a release of the set screws, a turning of the attachment ring to a desired location on the angle grinder bore, and a re-turning of the pair of set screw into the selected threaded screw holes to appropriately re-lock the dust director guard onto the angle grinder bore at the new, selected position. Further the guard also includes a spring loaded thumb screw located on the backside of the housing and is threaded for turning into the attachment ring, securing the attachment ring to the housing when it is turned therein, and, when turned out of the attachment ring, the attachment ring is allowed to pivot in its hole mounting in the inner wall. So arranged, release of the attachment ring to pivot, allows the operator to position the dust director portable vacuum guard appropriately to afford the operator with good visability of the angle grinder blade as it saws. Further, the thumb screw is spring loaded by fitting the threaded body thereof through a coil spring that is maintained to the screw head end undersurface and housing inner wall surface to maintain it in alignment with the hole through the housing inner wall The dust director guard further includes an extension cover that, when unsnapped after the grinder is stopped, can be pivoted away from the grinder blade, allowing the blade to be turned into a wall corner, simultaneously cutting the wall on both sides of the corner and into the corner. Whereafter, the grinder is again turned off, the extension cover is snapped back into place, allowing forward cutting to be resumed. Also unique to the dust director guard of the invention, the dust director guide barrel includes an air baffle that channels a dust flow as is pulled off the work area under vacuum, passed into the barrel that directs that flow into a vacuum system. The baffle, in practice, provides for a greater volume of dust collection off of the work area than does an open barrel alone.

DESCRIPTION OF THE DRAWINGS

In the drawings which illustrate that while is presently regarded as the best and preferred mode for carrying out the invention:

FIG. 12 is a view like that of FIG. 11 only showing the spring loaded thumb screw as having been turned, un-threading it from the attachment ring, allowing the attachment ring and connected angle grinder to be turned through approximately ninety (90) degrees, and showing the thumb screw as retained to the inner wall outer face by a coil spring that the screw is fitted through.

DETAILED DESCRIPTION OF THE INVENTION

Figure 1:
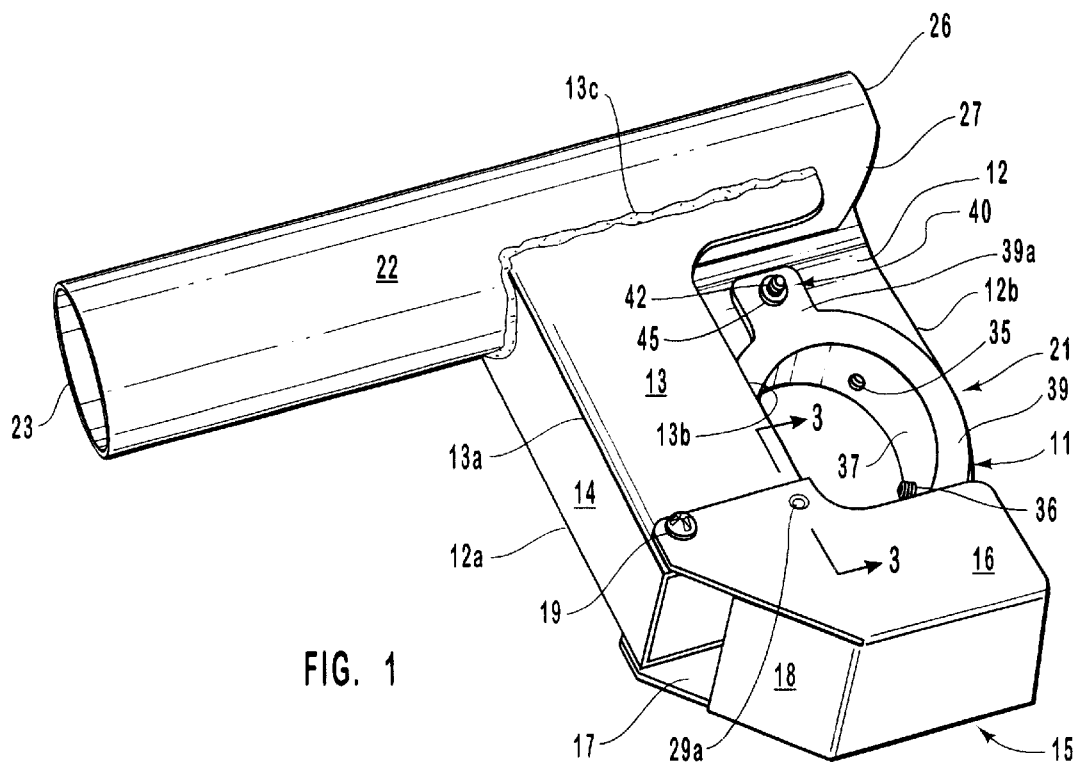
FIG. 1 is a side elevation perspective view taken from a rear and outer side of a dust director portable vacuum guard of the invention shown as including an attachment ring pivotally mounted in a housing inner wall hat is for attachment to a portable angle grinder bore and showing the dust director guard as including a straight open tube for fitting a vacuum hose thereover.
Figure 2:
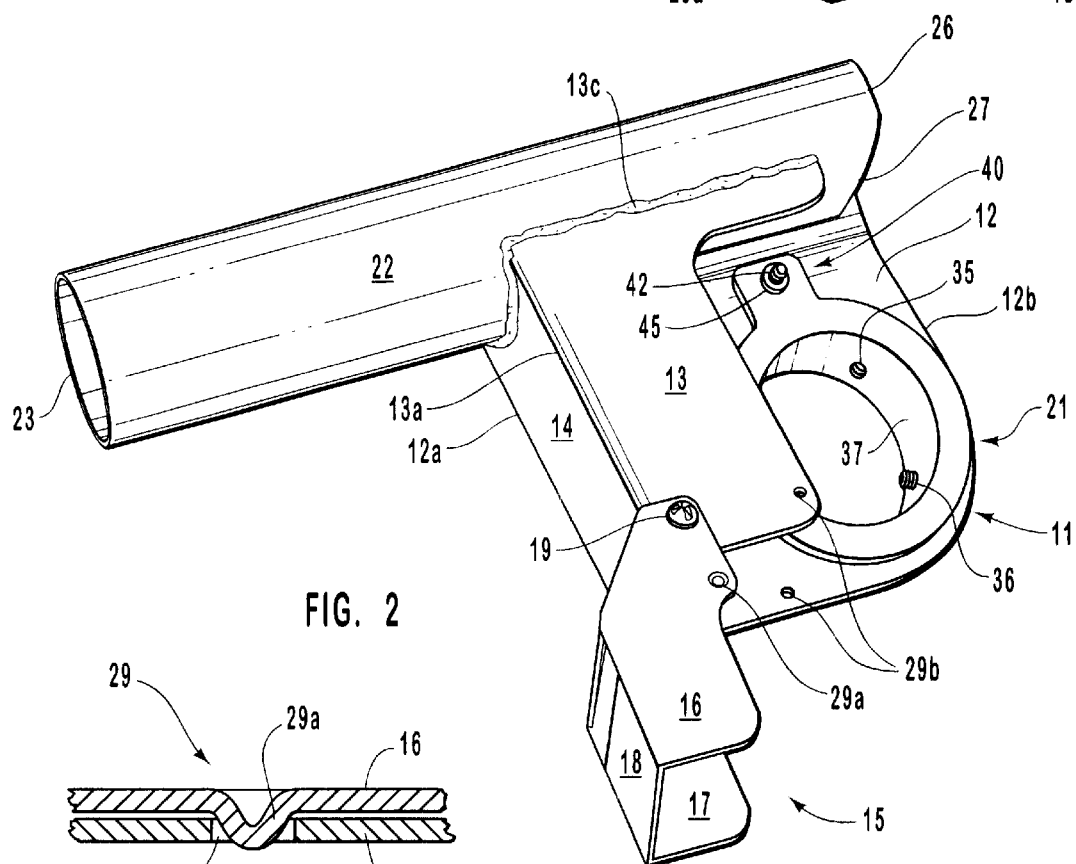
FIG. 2 is a view like FIG. 1 only showing an extension cover fitted over a butt end of the dust director portable vacuum guard that has one end released and the extension cover pivoted around a pivot coupling at its other end, opening the housing butt end.
Figure 3:
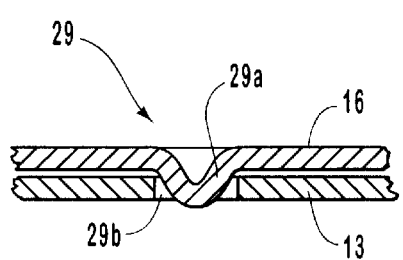
FIG. 3 shows a sectional view taken along the line 3—3 of FIG. 1, showing a detent type closure of the extension cover end to the housing butt end.
Figure 4:
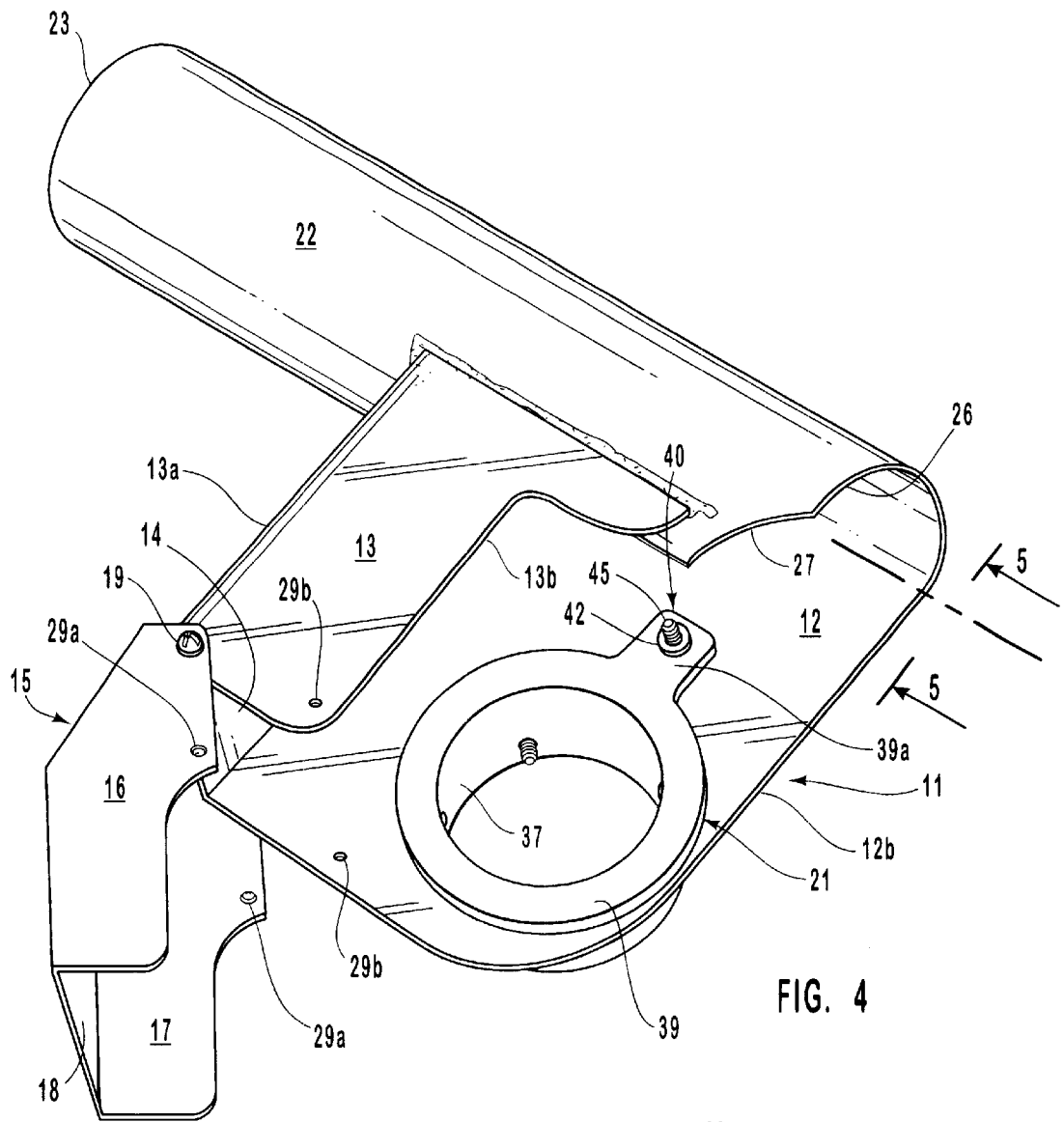
FIG. 4 is a perspective view like that of FIG. 2 only taken from a forward end of the dust director portable vacuum guard showing the attachment ring and an end view of an air baffle arrangement that is a section of the barrel between the dust director guard side and barrel exhaust slot.

The invention in a dust director portable vacuum guard 10 is shown alone in FIGS. 1, 2 and 4, and is shown installed to a portable angle grinder 30 in FIGS. 6 through 12. Shown in FIGS. 1, 2 and 4, the dust director portable vacuum guard 10, hereinafter referred to as dust director 10, includes, as an angle grinder mounting and turning housing 11, hereinafter referred to as housing 11 that consists of pair of parallel inner and outer walls 12 and 13. The inner and outer walls 12 and 13, respectively, have rear edges 12a and 13a, respectively, that are connected to parallel long sides of a rectangular end wall 14. The forward area of the inner and outer walls, 12 and 13, respectively are matched to inner and outer end walls 16 and 17 of an extension cover 15 that is open across a forward end and includes a rear wall 18 that is secured to the extension corner inner and outer end walls rear edges, forming a channel section that is coupled to ends of the outer walls 12 and 13 at like pivots 19, above an open section. Which open section allows the extension cover 15 to be pivoted between the attitudes shown in FIGS. 1 and 2, and is maintained in a locked attitude by a detent lock 20, shown in FIG. 3, and discussed in detail below.

The dust director 10 is open across the forward edges 12b and 13b of the inner and outer walls 12 and 13, respectively. The outer wall 13 forward edges 13b, as shown in FIGS. 1, 2 and 4, are set well back from the inner wall 12 forward edge 12b, with the inner wall 12 including an attachment ring 21 that is exposed between which inner and outer walls forward edges 12b and 13b. The attachment ring 21 is for connection to an angle grinder and, as set out and described in detail below, and is arranged for connection to a number of angle grinders as are currently being marketed.

Figure 5:
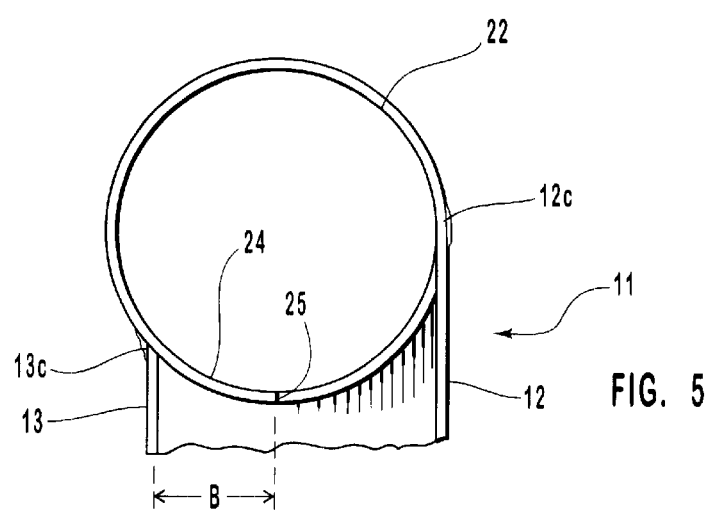
FIG. 5 is a front end view taken between the lines as 5—5 of FIG. 4, showing the barrel as open with the baffle arrangement shown on the left side thereof as a barrel section that terminates at the exhaust slot.

The dust director 10 housing 11 includes inner and outer walls 12 and 13, respectively, that include top edges 12c and 13c, respectively, that, as shown best in FIG. 5, connect, as by welding, into sides of a cylindrical tube or barrel 22, hereinafter referred to as barrel 22, that connects at a rear end 23 to a vacuum source that pulls a vacuum therethrough. Shown best in FIG. 5, the barrel 22 is open with the outer wall 13 joined or formed into the barrel right side wall, and with the inner wall 12 welded or otherwise connected along edge 12c to a left side of barrel 22, providing a section of the barrel to an edge 25 that forms an air baffle 24. Which air baffle 24, in practice is approximately eleven sixteenths (11/16) of an inch in width from joint 13c, shown as a welded joint with the end of inner wall 13, and is shown as a distance B in FIG. 5. The air baffle 24, as shown, extends to within approximately one (1) inch to the housing 11 inner bottom edge 12b, angling outwardly at 27 at, approximately a forty five (45) degree angle to the barrel 22 forward edge 26, providing a slot having a width of approximately thirteen sixteenth (13/16) on an inch that extends to the housing end wall and wherein an angle grinder 30 blade 38 turns. Hence, the air baffle 24 is, in practice, an extension of the vacuum air hose, attaining a maximum suction at the barrel forward edge 26 that is, approximately, the vacuum as is present at a very end of a vacuum air intake.

Figure 6:
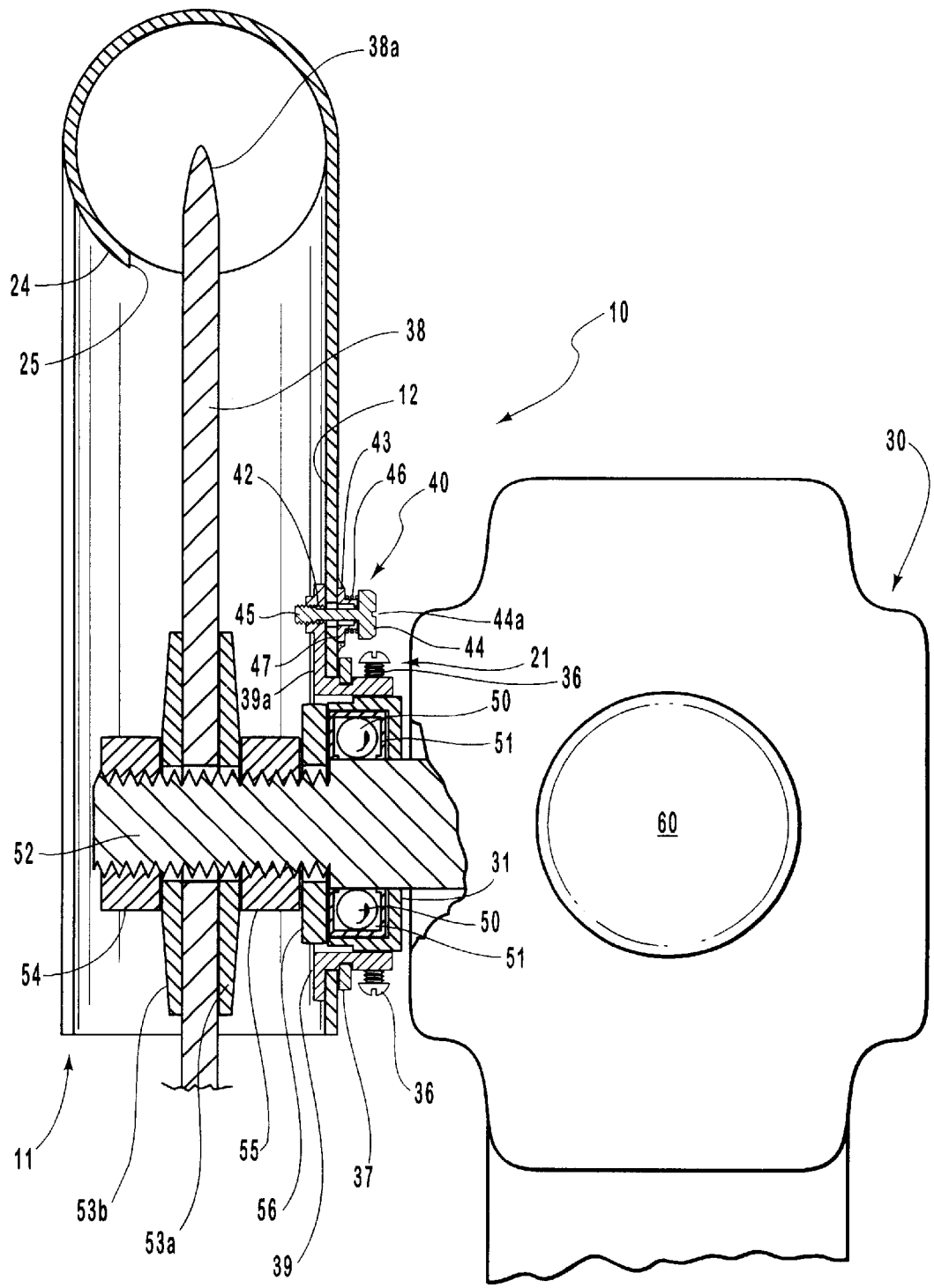
FIG. 6 is an enlarged end sectional view of the dust director guard of FIG. 1 mounted at its attachment ring to the bore of an angle grinder by a pair of set screws and showing a spring loaded thumb screw, with an angle grinder blade shown mounted onto a drive journaled through a bearing of the angle grinder, with a mounting bolt shown turned into a threaded mounting hole that is formed in the drive, and showing the blade turning alongside an edge of the baffle, as shown in FIGS. 4 and 5.
Figure 9:
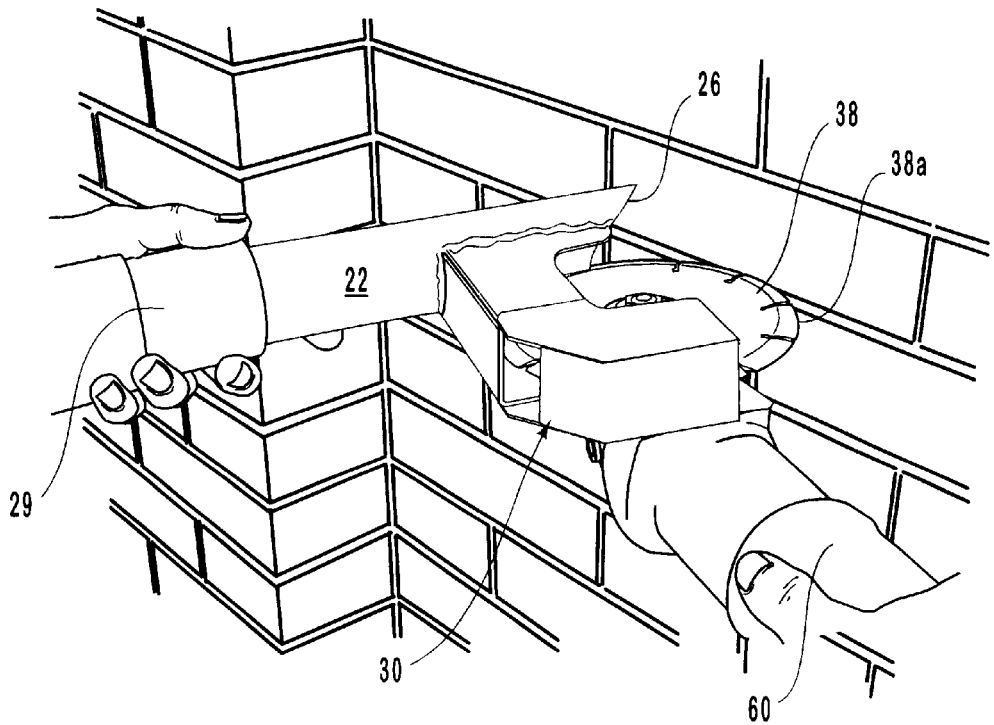
FIG. 9 shows an operator using the angle grinder of FIG. 4 holding the dust director guard barrel in their left hand with the angle grinder grip held in their right hand, maintaining that grip, as shown, at a right angle attitude to the barrel, with the extension cover shown in a closed attitude, and with the edge of the angle grinder blade shown aligned to saw into a grout joint between bricks of a wall.
Figure 10:
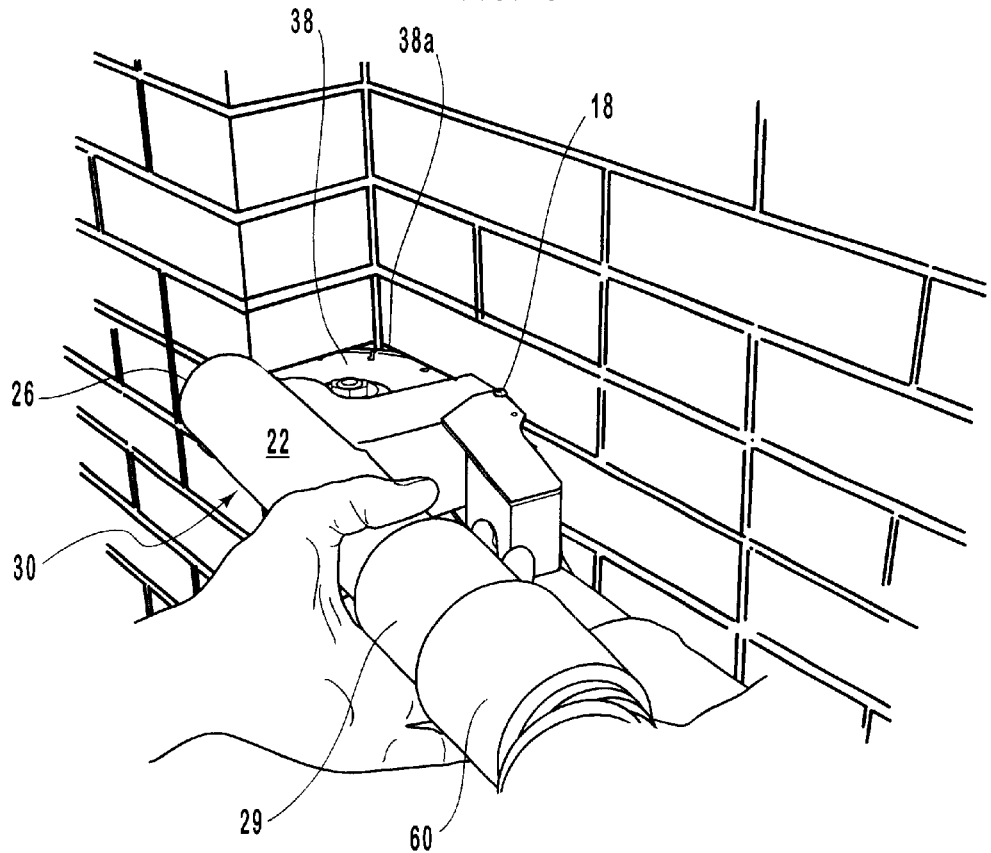
FIG. 10 is a view like that of FIG. 9 only showing the dust director guard barrel as having been pivoted to a position alongside of the angle grinder grip after release or un-threading of the spring loaded thumb screw, with the extension cover shown open allowing the angle grinder blade saw through a wall corner.

The housing 11, provides an open area within barrel 22 wherein an angle grinder blade 38 turns, as shown best in FIG. 6, that extends from the barrel edge 25, that is the edge of baffle 24, and the housing inner wall 12, and to the barrel junction with the housing end wall 14. In practice, as discussed hereinbelow relative to operation of the angle grinder 30 mounted to the dust director 10, the air baffle 24 tends to maintain the vacuum draw that is pulled through barrel 22 to around the turning angle grinder 30 blade 38, confining the vacuum pulling action to a work surface that the angle grinder is sawing along, as illustrated in FIGS. 9 and 10, thereby maximizing vacuum efficiency to remove dust and particulates off of that work surface.

Figure 7:
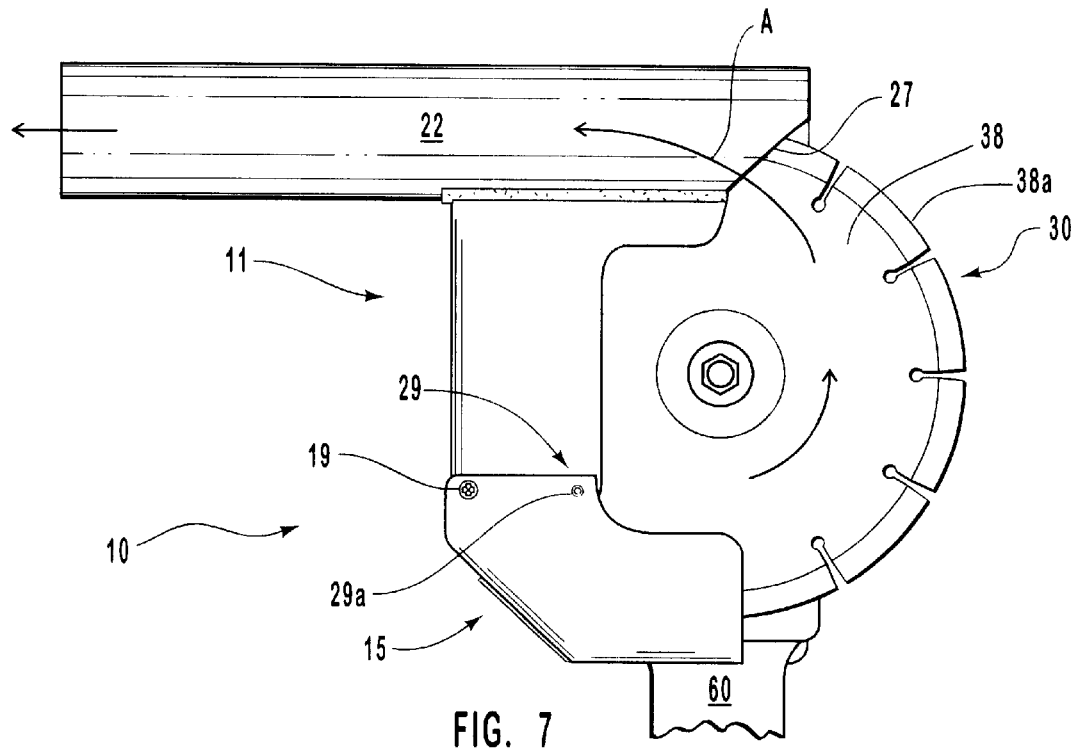
FIG. 7 is a side elevation view taken from the outer side of the dust director portable vacuum guard of FIGS. 1, 2 and 4 mounted onto a portable angle grinder, showing an angle grinder blade as turning counter clockwise, illustrate by arrow A, and showing, an angle grinder grip as having been positioned to extend forward of, and essentially parallel to, the guard barrel end.
Figure 8:
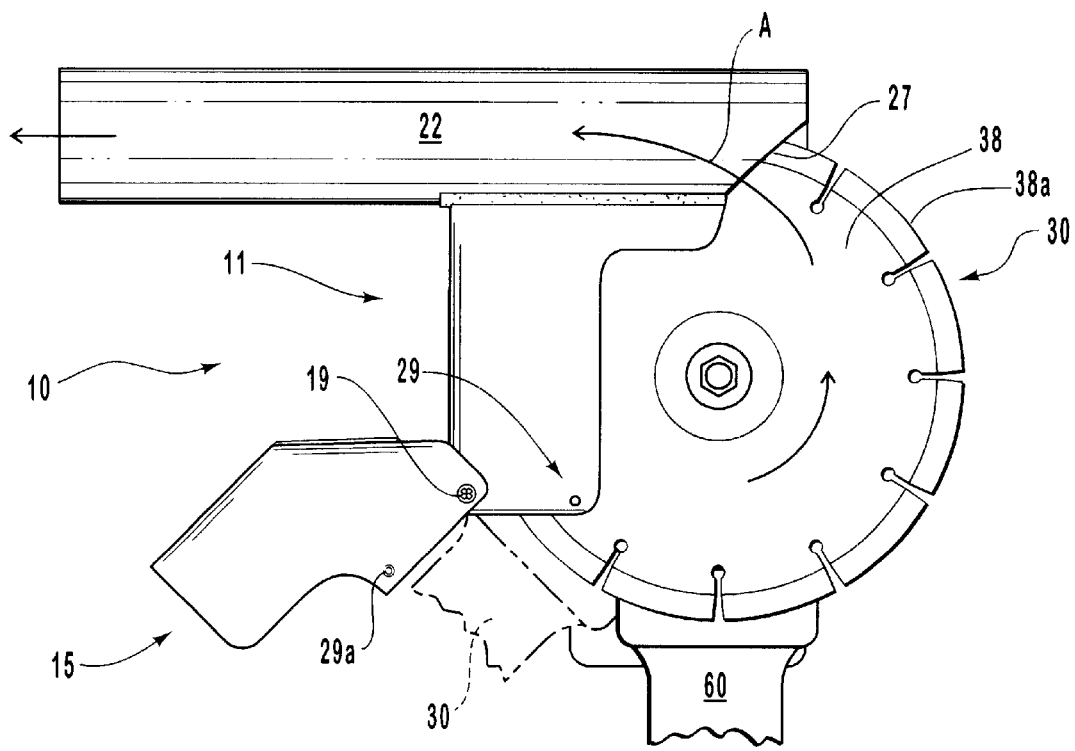
FIG. 8 is a side elevation view like that of FIG. 7 only showing, in solid lines, the angle grinder grip as having been pivoted opposite to the direction of turning, arrow A, illustrating how the dust director guard can be pivoted relative to the attachment ring and connected angle grinder bore after the spring loaded thumb screw is released, and with the extension cover shown open.

The open cylinder or tube forming the barrel 24 is straight and preferably has a diameter of approximately two (2) inches. A barrel rear end 23 is arranged for receiving a vacuum tube hose 29, as shown in FIGS. 9 and 10, fitted thereover, and a barrel forward or work contacting end 26 is open and, as shown in the cross sectional view of FIG. 6, is immediately adjacent to the angle grinder blade 38. The barrel 22 at end 26 is an extension of the inner wall 12, through approximately one hundred eighty degrees of arc, and then curves inwardly at 27 to the barrel edge 26, providing an open area at the barrel end 26 wherethrough an operator can observe the turning angle grinder blade 38 as it is guided along a work surface, as illustrated in FIGS. 7 and 8.

As set out above, the area between the housing inner wall 12 forward edge 12b and the housing outer wall forward edge 13b is open to receive angle grinder 30 that is mounted at its bore 31 to the attachment ring 21. The attachment ring 21 is fitted to turn in a hole formed in the inner wall 12, as shown best in FIG. 6 and in FIGS. 1, 2, and 4, and is intended to function as a universal angle grinder mounting to accommodate the mounting to the housing 11 of a number of commercially most popular angle grinders. To provide this universal mounting, the dust director 10 attachment ring 21 includes four equal spaced threaded set screw holes 35 that can each receive a machine set screw 36 turned therethrough. In practice, to mount a particular angle grinder 30 to the attachment ring 21, two of the set screw holes 35 are selected to match spaced depressions or a groove formed in the bore of a particular selected angle grinder, as illustrated by the angle grinder 30 and its bore 31. The screws 36, are shown as set screws, and are turned into through the selected set screw holes 35 into the depressions or a groove, locking the angle grinder to the attachment ring 21, as illustrated in FIG. 6. Which set screw holes 35, as illustrated in FIGS. 1 and 2, are preferably spaced at equal intervals around an open short cylinder 37 of the attachment ring, with the selected set screw holes 35, that receive the set screws 36, are preferably selected to be across from one another, for locking the angle grinder 30 bore 31 to the attachment ring 21.

Figure 11:
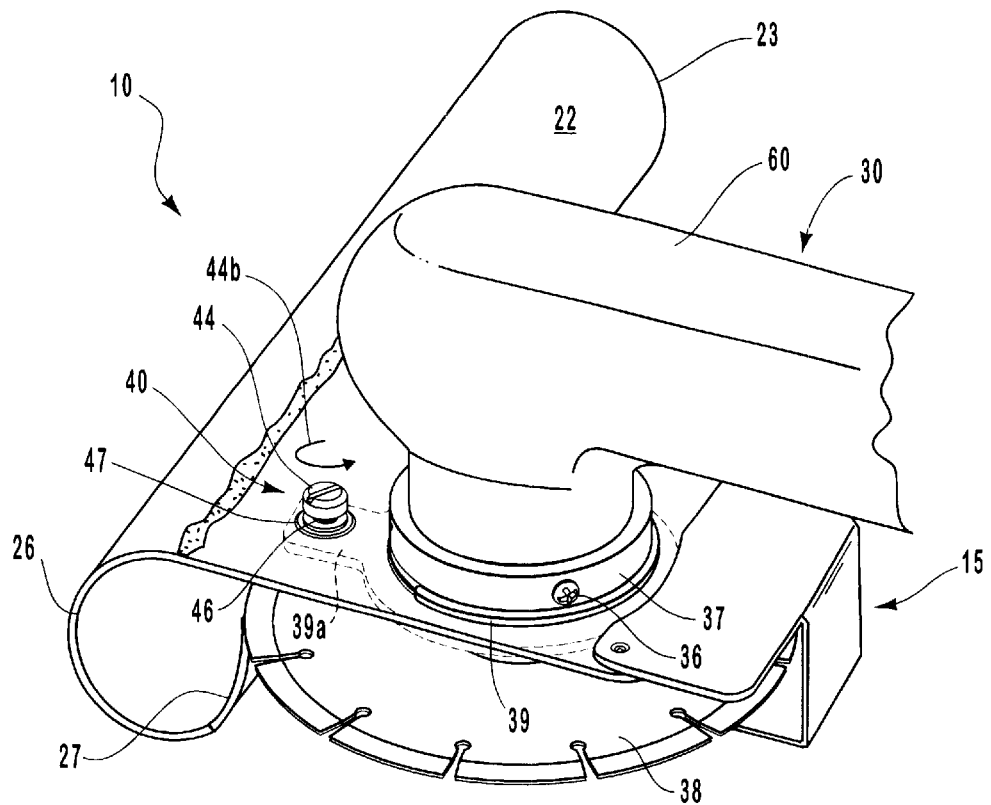
FIG. 11 is a bottom plan perspective view of the dust director portable vacuum guard with mounting the angle grinder, and with the angle grinder handle shown at a right angle to the barrel, and with the guard housing shown broken away above the attachment ring, showing the spring loaded thumb screw in its threaded attitude, locking the attachment ring in the guard housing, and showing, with a curved arrow, the thumb screw as being turned.
Figure 12:
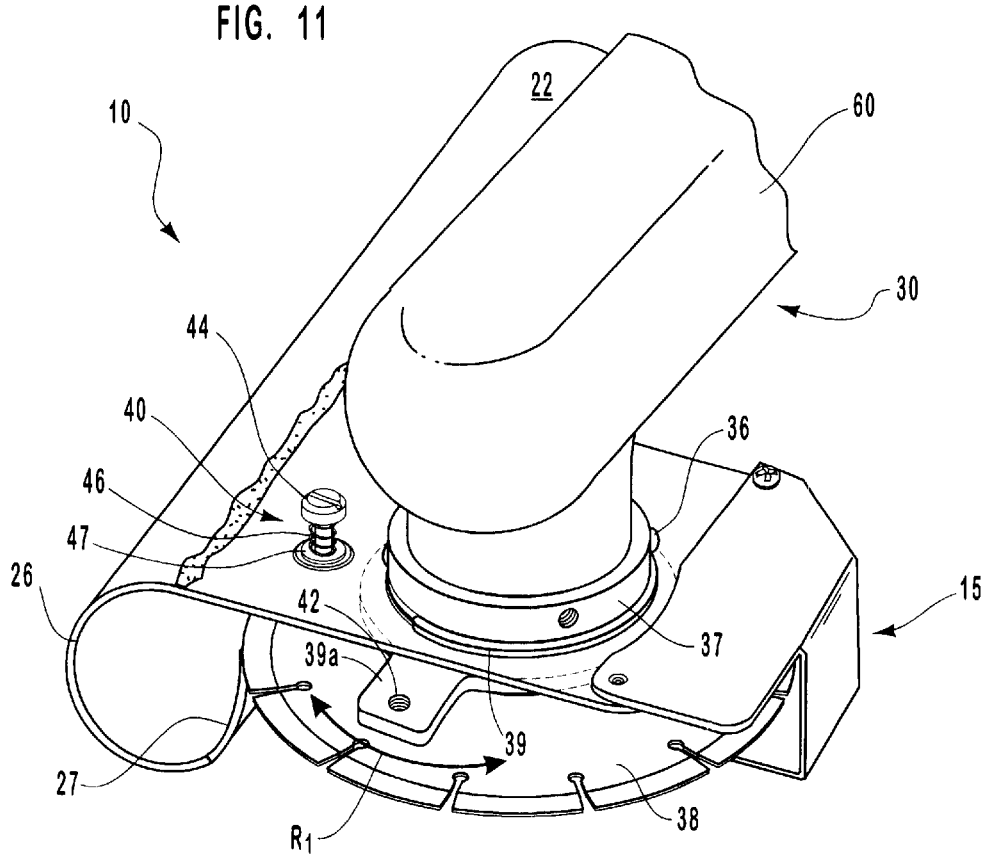

To provide an operator with a capability for rotating the housing 11 relative to the angle grinder blade 38 for a particular work situation, the attachment ring 21, by a spring biased thumb screw 40, hereinafter referred to as thumb screw, is releasable from its connection to the housing inner wall 12, allowing rotation of the attachment ring 21 and mounted bore 31 within the hole formed in the inner wall 12. The thumb screw 40, shown best in FIG. 6 and in FIGS. 11 and 12, is arranged for turning through a back side, or side away from the mounted angle grinder, and housing inner wall 12, to pass through a hole 43 formed through which inner wall for turning in a nut for threaded portion 42 that is formed in or secured to an outer surface of a tab 39a portion of a right angle flat flange 39 of the attachment ring 21. The thumb screw 40 includes a broad flat head end 44 and threaded body 45, with the broad head 44 including a slot thereacross for receiving a screw driver blade, and also can be turned manually by an operator to who grips a head end 44, at a knurled outer edge surface, between their fingers.

In practice, the angle grinder bore 31 is secured, as described above, by set screws 36 that are passed through the attachment ring 21 and into holes, a slot, detents, or the like, that are formed in the bore 31. So arranged, the attachment ring 21 is free to rotate until it is fixed in placed by an operator turning the thumb screw 40 body 45 through the inner wall 12 hole 43 and into the nut or threaded portion 42 of tab 39a, coupling the attachment ring 21 and angle grinder bore 31 to the inner wall 12. Should, however, the operator wish to release the coupling that is provided by the thumb screw 40, the thumb screw head end 44 is turned to turn the thumb screw body 45 out of the nut or threaded portion 42, as shown by an arrow 44B on FIG. 11, until the thumb screw body end passes out from the inner wall 12 nut or threaded portion 42, releasing the connected attachment ring 21, allowing it and the angle ringer bore 31 to turn in the inner wall 12 hole 43. For maintaining the screw body 45 in alignment with the hole through the inner wall 12 after release from the nut or threaded portion, the screw body 45 is fitted through a coil spring 46 whose end is maintained to a washer 47 that is fixed to the inner wall surface at the inner wall hole 43, as by welding it onto the edge of inner wall hole 43. The coil spring 46 is thereby retained between the undersurface of thumb screw head 44 and washer 47, aligning the end of screw body 45 with the inner wall hole 43 after the tube screw 40 is turned out of the nut or threaded portion 42 of the attachment ring tab 39a, as shown in FIG. 12. The attachment ring 21 is thereby free to rotate within its mounting in the inner wall 13 hole. With a re-coupling of the attachment ring 21 requiring only an operator pushing on the bolt head end 44 to compress the coil spring and urge the bolt 40 threaded end 45 into the nut or threaded hole 42 to re-secure the attachment ring to the housing inner wall 12, shown in FIGS. 1, 2, 4, 6 and 11.

Shown in FIG. 6, the angle grinder 30 includes the bore 31 whereto the attachment ring 21 is mounted that, as shown includes roller bearings 50. The roller bearings 50 are shown maintained in a track 51 that engage the surface of a drive shaft 52 whereon the blade 38 is mounted between inner and outer mounting plates 53a and 53b, respectively. The mounting plates 53a and 53b are urged together with the blade 38 therebetween by turning a nut 54 onto a threaded end of the drive shaft 52. Which drive shaft is shown as having been turned through an inner nut 55 that engages an outer surface of a washer 56 whose inner surface is engagement with the side of bearing race 51. So arranged, the angle grinder bore 31 is mounted to the attachment ring 21 so as to be both rigidly fixed thereto by set screws 36. The attachment ring 21 is allowed to rotate in its inner wall 13 mounting upon release of the thumb screw 40, as set out above, to afford an operator the flexibility to position the dust director 10 in relation to the angle grinder 30 to allow an operator to cut through a corner, accommodating the operators cutting or sawing needs.

Dust director 10 pivoting relative to the angle grinder 30 is allowed by the release of the attachment ring 21, as set out above, allowing the operator to position the angle grinder handle 60, that they hold in one hand, appropriately for the cutting task involved, from sawing along a wall joint and through a corner, such as a cement joint between bricks, as shown in FIGS. 7 through 12. To saw into and through a corner, as shown in FIG. 10, with the attachment ring 21 released, as shown in FIG. 12, the operator holds a vacuum hose 29 fitted onto the barrel 22 end 23 in their left hand and with handle 60 of the angle grinder 30 held in their right hand, and with the barrel 22 end 26 held close to the wall surface wherein the blade 39 is cutting. As the turning angle grinder 30 blade 39 approaches the corner, shown in FIGS. 8 and 10, the angle grinder handle 60, is moved from the position shown in FIGS. 7, 9 and 12, through the attitude shown in broken lines in FIG. 8, to the attitude shown in FIGS. 10 and 12 to be approximately parallel to the barrel 22. Additionally, for cutting through a wall corner, with the angle grinder turned off, the extension cover 15 detent coupling 20 is released, and the extension cover is pivot around its pivot coupling, as shown in FIGS. 8 and 10, thereby opening area between inner and outer walls 12 and 13 below the pivots 19, the extension cover 15 pivoting to where a rear edge of a web 18 between sides 16 and 17 of the extension cover 15 engages the housing rear wall 14. Open the extension cover to the attitude shown in FIG. 8 allows the operator to better see and guide the angle grinder turning blade 38 through a wall corner, as shown in FIG. 10. Shown best in FIG. 3, the detent coupling 29 includes a protrusion 29a that extends inwardly from the extension cover 15 inner wall to fit into a hole 29b that is formed through the housing inner wall 13. The protrusion 29a will travel into, to snap in and be held in, the hole 29b, when the extension cover is manually pivoted around pivots 19, and is disengaged out from hole 29b when an operator, with their fingers, pulls the extension cover 15 away from the inner wall 13 lower edge. Accordingly, to cut around a corner like that shown in FIG. 10, the operator stops the angle grinder 30 and pulls the extension cover 15 lower end and the lower edge of extension cover rear wall 18. The extension cover 15 easily snaps out of covering engagement between the lower edges of the housing inner and outer walls 13 and 14, allowing the angle grinder blade to cut through corners, and like inwardly angled sections of a wall. In which cutting operation, an operator appropriately pivots the angle grinder handle 60 and maintains the barrel end 26 proximate to the work surface that is being sawed.

For sawing a wall like that shown in FIGS. 9 and 10, the blade 38 will preferably have a diamond or hard metal cutting edge 38a. As described above, by appropriate pivoting of the angle grinder handle 60 relative to the guard 10, after release of the thumb screw 40, between the attitudes shown in FIGS. 9 through 12, and by appropriate pivoting of the extension cover 15 between open and closed attitudes, the operator can maintain a view of, and effectively guide the turning blade 38 cutting edge 38a, across and around a work surface, like that shown in FIGS. 9 and 10. In which sawing operations., as shown in FIGS. 9 and 10, the operator maintains the barrel 22 work contacting end 26 close to the work surface. Which barrel 22 provides, with its air baffle 24, as set out and described above, for an improved suction. Which air baffle 24 extends into the barrel 22 to its barrel edge 25 a distance B from the outer wall surface, and is proximate to the turning angle grinder blade 38. Thereby, a vacuum pulled through the barrel from end 26 lifts materials off of a work surface, such as a masonry wall that is being sawed by the angle grinder blade turning in a counter-clockwise direction as indicated by arrows A in FIGS. 7 and 8 and arrow R1 in FIG. 12. In which vacuuming, the materials pulled by the vacuum are channeled past the barrel forward edge 26 that condenses the flow and limits turbulence. The baffle 24 thereby provides optimum suction at the turning blade 38 cutting edge, greatly improving the dust removal capability over a barrel without a baffle arrangement. In practice, use of the dust director 10 of the invention eliminates practically all dangerous dust and particulates from the work area.

Hereinabove has been set out a description of a preferred embodiment of a dust director portable vacuum guard of the invention, and while a preferred embodiment thereof had been shown and described herein, it should be understood that the invention can be modified within the scope of the present disclosure without departing from the subject matter coming within the scope of the following claims, and a reasonable equivalency thereof, which claims 1 regard as my invention.

I claim:

1. A dust director portable vacuum guard comprising, a housing formed from a stiff material to include a hollow straight tube as a barrel, a pair of thin flat inner and outer walls that are spaced apart, are essentially parallel to one another, and connect at right angles to a back wall, and each said inner and outer wall is connected along a straight edge to said straight tube, with said inner wall connection to said straight tube spaced a distance apart from an edge of a longitudinal slot formed in said straight tube that extends from a forward end of said straight tube to said back wall, providing an air baffle to a vacuum flow that is pulled through said barrel; an attachment ring for releasable mounting in an opening formed through said inner wall, adjacent to a corner of forward and bottom edges thereof, that is for receiving and mounting to a bore of an angle grinder fitted therein, and a leading edge of the inner and outer walls where said outer wall leading edge is straight and is set back from said inner wall leading edge, crossing an opening in an edge of said the inner wall, with said forward end of said straight tube approximately aligning with the leading edge of said inner wall; at least one thumb screw for releasably maintaining said attachment ring to turn in said inner wall opening; and at least one set screw fitted to turn through said attachment ring to mount said angle grinder bore to said attachment ring.

2. The dust director vacuum guard as recited in claim 1, further including an extension cover that is formed as a channel section having parallel upstanding side walls and a web secured at right angles between aligned side wall parallel edges that is of a width to span across an open area between the housing inner and outer walls and is pivotally connected to close over said housing inner and outer walls open area; and including means for releasably coupling another end of said extension cover, spaced from its pivot connection to said housing.

3. The dust director portable vacuum guard as recited in claim 2, wherein the extension cover is open across an area above the web, between said side walls, and adjacent to the pivot connection, allowing said extension cover to pivot from a housing lower end covering attitude to an extended attitude of approximately ninety degrees or greater taken from lower ends of the housing inner and outer walls.

4. The dust director portable vacuum guard as recited in claim 2, wherein the means for releasably coupling is a detent coupling consisting of a dimple that extends inwardly from one of said extension cover side walls to fit into a hole formed in an opposing one of said housing inner or outer walls corresponding to said one of said extension cover side walls, with said detent to fit into said hole when said extension cover is closed over a lower end of said housing.

5. The dust director portable vacuum guard as recited in claim 1, wherein the air baffle is formed by a straight tube inner edge that extends into the longitudinal slot approximately there quarters of an inch from the junction of said longitudinal slot with an inner wall top edge.

6. The dust director portable vacuum guard as recited in claim 5, wherein the air baffle is approximately eleven sixteenths of an inch in width and, at a forward end, is angled outwardly at approximately a forty five degree angle to a forward end of the barrel.

7. The dust director portable vacuum guard as recited in claim 1, wherein the means for mounting the angle grinder bore in the attachment ring are a plurality of equal spaced threaded holes formed through said attachment ring that are accessible from an outer face of the housing inner wall, and with a pair of said spaced threaded holes to each receive a set screw turned therethrough into engagement with said angle grinder bore.

8. The dust director portable vacuum guard as recited in claim 1, wherein the attachment ring includes a flange edge for positioning between the housing inner and outer walls when said attachment ring is fitted into a hole in the housing inner wall, which said attachment ring is formed to turn in said housing inner wall opening, and set screws are turned into, to couple to, an angle grinder bore and the thumb screw has a broad head end and threaded body that is to pass through a hole formed through said housing inner wall and through a tab that extends outwardly from and in the plane of said attachment ring flange, and includes a tab threaded opening to receive an end of said thumb screw turned therein.

9. The dust director portable vacuum guard as recited in claim 8, wherein the thumb screw is fitted through a coil spring maintained between the housing inner wall surface and said thumb screw head end, providing a biasing of the screw end out of the tab threaded means; and said head end is broad and has an outer edge that facilitates manual turning.

10. The dust director portable vacuum guard as recited in claim 1, wherein the attachment ring includes four equal spaced threaded holes with a pair of holes as are directly across from one another with each hole to receive one of a pair of set screws mounting the angle grinder bore.

11. The dust director portable vacuum guard as recited in claim 1, the barrel is a hollow tube approximately two inches in diameter.

12. The dust director portable vacuum guard as recited in claim 1, wherein a leading or forward edge of the outer wall is approximately aligned with a rear edge of the attachment ring hole, and a junction of the outer wall lower edge and said leading or forward edge is rounded.

13. The dust director portable vacuum guard as recited in claim 1, wherein the slot formed in the barrel extends from hollow tube forward end to approximately the barrel junction with a top edge of a web that is secured to, and extends between, rear edges of the inner and outer walls.

14. The dust director portable vacuum guard as recited in claim 1, wherein the dust director housing is formed from aluminum or thin gauge steel.

* * * * *